(12) United States Patent  
Codreanu et al.

(10) Patent No.: US 8,208,963 B2
(45) Date of Patent: Jun. 26, 2012

(54) COMMUNICATION METHOD AND SYSTEM

(75) Inventors: Marian Codreanu, Oulu (FI); Antti Tölli, Oulu (FI); Markku Juntti, Oulu (FI); Matti Latva-Aho, Oulu (FI)

(73) Assignee: Nokia Corporation, Espoo (FI)

( * ) Notice: Subject to any disclaimer, the term of this patent is extended or adjusted under 35 U.S.C. 154(b) by 779 days.

(21) Appl. No.: 11/711,681

(22) Filed: Feb. 28, 2007

(65) Prior Publication Data

US 2008/0150514 A1 Jun. 26, 2008

(30) Foreign Application Priority Data

Dec. 21, 2006 (FI) .................................... 20065841

(51) Int. Cl.
*H04B 1/00* (2006.01)
*G01S 13/00* (2006.01)
*H01Q 21/08* (2006.01)
(52) U.S. Cl. ..................... 455/562.1; 342/147; 342/442; 343/824
(58) Field of Classification Search ........................ None
See application file for complete search history.

(56) References Cited

U.S. PATENT DOCUMENTS

| 5,805,983 | A  | * | 9/1998 | Naidu et al. ................ 455/67.16 |
| 6,597,730 | B1 | * | 7/2003 | Bader ............................ 375/219 |
| 6,654,590 | B2 | * | 11/2003 | Boros et al. ................. 455/67.14 |
| 2006/0023803 | A1 | * | 2/2006 | Perlman et al. .............. 375/267 |
| 2006/0058022 | A1 | * | 3/2006 | Webster et al. ............... 455/423 |
| 2006/0109927 | A1 |   | 5/2006 | Magee et al. |

FOREIGN PATENT DOCUMENTS

| EP | 1 271 802 A1 | 1/2003 |
| EP | 1 724 875 A1 | 11/2006 |
| WO | WO 2006/103283 A1 | 10/2006 |
| WO | WO 2007/103085 A2 | 9/2007 |

OTHER PUBLICATIONS

International Search Report PCT/FI2007/050709 filed Dec. 19, 2007.

* cited by examiner

*Primary Examiner* — Jinsong Hu
*Assistant Examiner* — William Nealon
(74) *Attorney, Agent, or Firm* — Squire Sanders (US) LLP

(57) ABSTRACT

There is provided a method comprising: determining a phase difference between at least two antenna units of a distributed antenna system on the basis of at least one pilot signal received from at least one of a plurality of antenna units; and transmitting phase correction commands to a common base station of the plurality of antenna units on the basis of the determined phase difference in order to synchronize carrier phases between at least two antenna units of the distributed antenna system.

33 Claims, 3 Drawing Sheets

COMMUNICATION METHOD AND SYSTEM

FIELD

The invention relates to a method, to a communication system, to a base station, to a user entity, to a network entity, and to a computer-readable program distribution medium.

BACKGROUND

Concepts based on multiple transmit and receive antennas are the most promising techniques for achieving high data rate communication. However, since the carrier frequencies are expected to grow in the future wireless communications systems (e.g. to 5 GHz for so called fourth generation), the path loss also increases and reduces the advantages offered by traditional multiple-input multiple-output (MIMO) system architecture.

To overcome this loss, a new network architecture based on distributed antenna concept has been recently proposed. The key idea of this proposal, referred as distributed MIMO system, comprises distributing groups of antennas over a large geographical area. All the antenna groups are connected to a common base transceiver station (BTS) where the actual radio frequency and base band processing units as well as radio resource and network management functionalities are included. The advantage of this system is that all antenna groups can fully cooperate. However, for a full cooperation, the carrier frequency and phase synchronization is required, and hence, the traditional synchronization methods applied to co-located antennas systems can not be used.

As an example let us consider a case where some antennas belonging to different antenna groups cooperatively create beams into a desired direction. This technique is referred to a distributed beamforming transmission from now on. Clearly this technique requires all active antenna groups to be fully phase synchronized at the carrier level in order to control phase difference between all the transmitted signals. However, the carrier phase synchronization between the antenna groups situated at large distances (e.g. hundred of meters) is a serious problem and is hard to be solved just by calibration of the connection cables between the antenna groups and the common BTS. In the absence of a carrier phase synchronization the cooperative transmission using different antenna groups is limited to non-coherent transmit diversity techniques. This limits most of the gains provided by the possibility to jointly optimize the signals transmitted in different antenna groups at the common BTS. For example, two different unsynchronized antenna groups cannot perform joint beamforming towards a common intended user.

There are methods for carrier phase correction in collocated multiple antenna systems including phase locked loops for synchronizing different oscillators and calibration of the connection cables. These known algorithms relay on the fact that there is only a short distance between the BTS and the antenna groups, i.e., the initial calibration of the connection is well preserved (stable) in time. However, this cannot be applied when there are large distances between BTS and antenna groups. Thus, there is a need to find solutions for carrier phase correction in distributed communication systems using a common BTS.

BRIEF DESCRIPTION OF THE INVENTION

An object of the invention is to provide an improved method, communication system, base station, user entity, network entity, and computer-readable program distribution medium.

According to an aspect of the invention, there is provided a method comprising: determining a phase difference between at least two antenna units of a distributed antenna system on the basis of at least one pilot signal received from at least one of a plurality of antenna units; and transmitting phase correction commands to a common base station of the plurality of antenna units on the basis of the determined phase difference in order to synchronize carrier phases between at least two antenna units of the distributed antenna system.

According to another aspect of the invention, there is provided a communication system comprising: a plurality of antenna units of a distributed antenna system; a common base station of the plurality of antenna units; a processing unit for determining a phase difference between at least two antenna units on the basis of at least one pilot signal received from at least one of a plurality of antenna units; a processing unit for providing phase correction commands to the common base station of the plurality of antenna units on the basis of the determined phase difference; and a synchronizing unit for synchronizing carrier phases between at least two antenna units of the distributed antenna system on the basis of the transmitted phase correction commands.

According to another aspect of the invention, there is provided a base station comprising: a processing unit for receiving phase correction commands relating to a plurality of antenna units of a distributed antenna system, the phase correction commands being determined on the basis of a determined phase difference between at least two antenna units on the basis of at least one pilot signal from at least one of the plurality of antenna units; and a synchronizing unit for synchronizing carrier phases between at least two antenna units of the distributed antenna system on the basis of the received phase correction commands.

According to another aspect of the invention, there is provided an antenna unit comprising: one or more antennas for enabling transmission and reception of signals; and a processing unit for providing a pilot signal to enable determination of a phase difference between at least two antenna units of a distributed antenna system, and for enabling a common base station of the plurality of antenna units to synchronize carrier phases between at least two antenna units on the basis of the determined phase difference.

According to another aspect of the invention, there is provided a network entity comprising: a receiver for receiving pilot signals from a plurality of antenna units of a distributed antenna system; a processing unit for determining a phase difference between at least two antenna units on the basis of the received pilot signals; and a transmitter for transmitting phase correction commands to a common base station of the plurality of antenna units on the basis of the determined phase difference in order to synchronize carrier phases between at least two antenna units of the distributed antenna system.

According to another aspect of the invention, there is provided a computer-readable program distribution medium encoding a computer program of instructions for executing a computer process for synchronizing. The process comprises: determining a phase difference between at least two antenna units of a distributed antenna system on the basis of at least one pilot signal received from at least one of a plurality of antenna units; and transmitting phase correction commands to a common base station of the plurality of antenna units on the basis of the determined phase difference in order to synchronize carrier phases between at least two antenna units of the distributed antenna system.

According to another aspect of the invention, there is provided a communication system comprising: a plurality of antenna units of a distributed antenna system; a common base station of the plurality of antenna units; processing means for determining a phase difference between at least two antenna units on the basis of at least one pilot signal received from at least one of the plurality of antenna units; processing means for providing phase correction commands to the common base station of the plurality of antenna units on the basis of the determined phase difference; and synchronizing means for synchronizing carrier phases between at least two antenna units of the distributed antenna system on the basis of the transmitted phase correction commands.

According to another aspect of the invention, there is provided an antenna unit comprising: one or more antennas for enabling transmission and reception of signals; and processing means for providing a pilot signal to enable the determination of a phase difference between at least two antenna units of a distributed antenna system, and for enabling a common base station of a plurality of antenna units to synchronize carrier phases between at least two antenna units on the basis of the determined phase difference.

According to another aspect of the invention, there is provided a network entity comprising: receiving means for receiving pilot signals from a plurality of antenna units of a distributed antenna system; processing means for determining a phase difference between at least two antenna units on the basis of the received pilot signals; and transmitting means for transmitting phase correction commands to a common base station of the plurality of antenna units on the basis of the determined phase difference in order to synchronize carrier phases between at least two antenna units of the distributed antenna system.

The invention provides several advantages. Full carrier phase synchronization in any distributed antenna system is enabled, thus permitting a full cooperation between all antennas in the network. The network capacity is increased. The phase errors due to different propagation times through link cables can be compensated. A simple but yet effective feedback assisted dynamic phase correction is provided.

LIST OF DRAWINGS

In the following, the invention will be described in greater detail with reference to the embodiments and the accompanying drawings, in which FIG. 1 illustrates an example of a communication system in which embodiments of the invention may be implemented;

DESCRIPTION OF EMBODIMENTS

Figure 1:
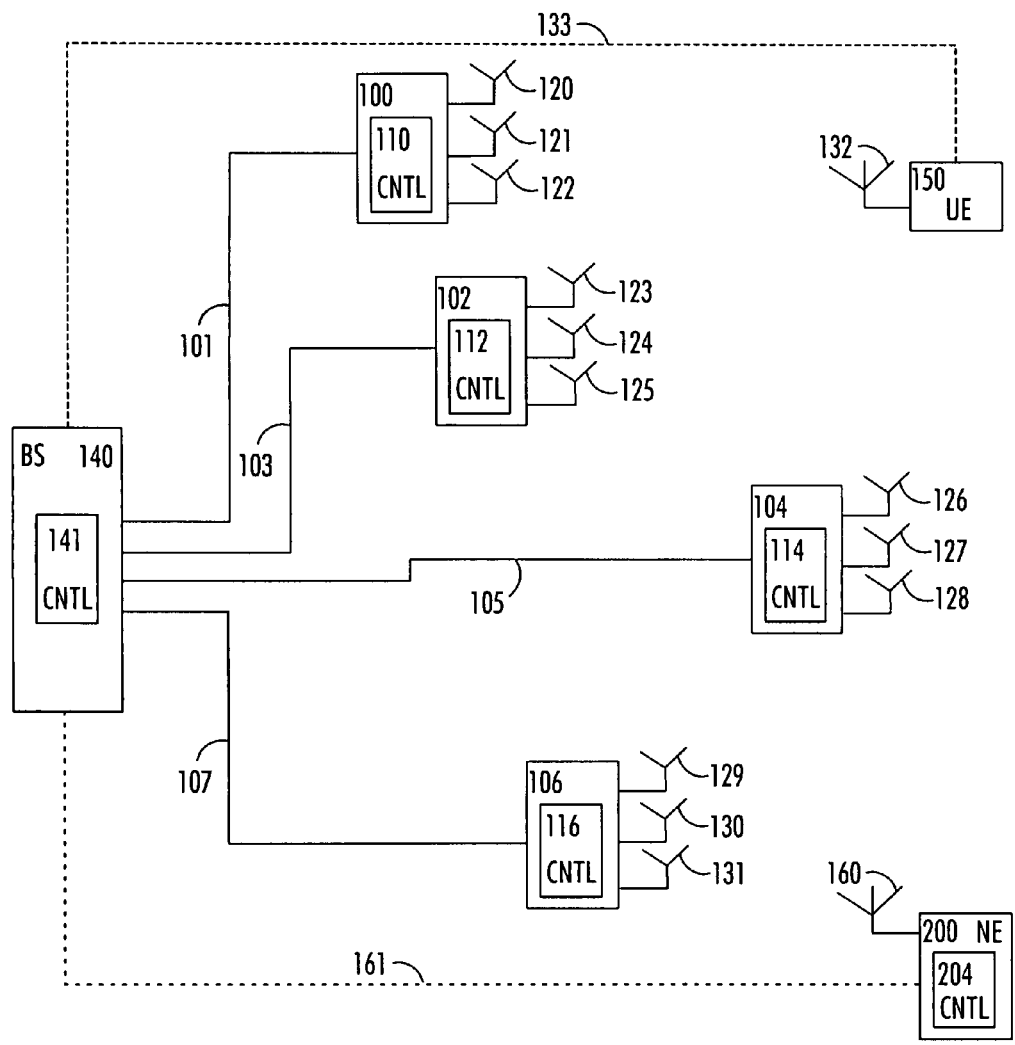

With reference to FIG. 1, let us examine an example of a distributed antenna system to which embodiments of the invention can be applied. The distributed antenna system has multiple antennas spatially distributed throughout each cell. In the example of FIG. 1, a common base station 140 communicates with a number of antenna units 100, 102, 104, 106 over communication links 101, 103, 105, 107 respectively. The communication links 101, 103, 105, 107 between the antenna units 100, 102, 104, 106 and the common base station 140 can be, e.g. wired or wireless, such as baseband (e.g. over optical fibre) or radio frequency (e.g. radio over fibre). Also a wireless link between the antenna units and the base station is possible. The system can be any distributed antenna system. In an embodiment, the distributed antenna system is a multiple-input multiple-output (MIMO) based 4G system.

Each of the antenna units 100, 102, 104, 106 comprises capability to transmit and receive information signals by using antennas 120 to 131. In an embodiment, the antenna units 100, 102, 104, 106 may include a plurality of antennas for enabling multiple input multiple output (MIMO) transmission and reception of signals.

The antenna units 100, 102, 104, 106 may further comprise a processing unit 110, 112, 114, 116 to control functions of the antenna units 100, 102, 104, 106. The processing unit 110, 112, 114, 116 controls reception of information by controlling the processing of reception signals. The processing unit 110, 112, 114, 116 may be implemented by a digital signal processor with suitable software embedded in a computer readable medium, or by separate logic circuits, for example with ASIC (Application Specific Integrated Circuit).

The base station 140 may be a base transceiver station of a mobile communication system, such as UMTS (Universal Mobile Telecommunications System), or an access point to WLAN (Wireless Local Area Network). The base station 140 further comprises a communication interface to provide a wired connection to the network of a telecommunication system. The network of the telecommunication system may provide connections to other networks, such as the Internet.

The base station 140 further comprises a processing unit 141 to control functions of the base station 140. The processing unit 141 handles communication with the antenna units 100, 102, 104, 106 of the distributed antenna system. The base station 140 also provides antenna units 100, 102, 104, 106 with information related to the data transmission from/to one or more user entities 150. The information may comprise information transmission parameters the antenna units 100, 102, 104, 106 should use in data transmission. The processing unit 141 may be implemented by a digital signal processor with suitable software embedded in a computer read-able medium, or by separate logic circuits, for example with ASIC (Application Specific Integrated Circuit).

Let us assume that a user entity 150 is in coverage area of two antenna units 100 and 102. All the transmitted signals towards the user entity 150 are required to be phase synchronized. Since the antenna units 100 and 102 reside far apart from each other, then the known synchronization methods cannot be used.

In an embodiment, a simple but effective feedback assisted dynamic phase correction method is proposed. In an embodiment, pilot signals transmitted from the antenna units 100, 102, 104, 106 are used to measure phase differences between the different antenna units. Then, simple phase correction commands are fed back to the common base station 140 for synchronizing the carrier phases between different antenna units.

In an embodiment of FIG. 1, a processing unit 110, 112, 114, 116 of an antenna unit 100, 102, 104, 106 receives one or more pilot signals directly from other antenna units 100, 102, 104, 106 via antennas 120 to 131. This scenario can take place when the other antenna units are in near vicinity, e.g. from tens to hundreds of meters. In an embodiment, the pilot signals can be received during a predefined idle periods dedicated for carrier phase synchronization and/or for any other control processes. The existing connections between the antenna units 100, 102, 104, 106 and the common base station 140 can be utilized in the phase correction signaling.

The processing unit 110, 112, 114, 116 of an antenna unit 100, 102, 104, 106 determines a phase difference between at least two antenna units on the basis of the received at least one pilot signal from at least one of the plurality of antenna units. Further, the processing unit 110, 112, 114, 116 transmits phase correction commands to the common base station 140 of the plurality of antenna units on the basis of the determined phase difference. The processing unit 141 of the common base station uses the received phase correction commands for synchronizing carrier phases between at least two antenna units of the distributed antenna system.

In another embodiment, a dedicated network entity 200, e.g. fixed or mobile terminal, is used for the carrier phase synchronization. In the case where the antenna units 100, 102, 104, 106 are placed too far from each other or a direct connection between the antenna units 100, 102, 104, 106 is obstructed by for example a thick wall between the antenna units 100, 102, 104, 106, then one or more dedicated network entities 200 can be located in an area where at least part of the antenna units 100, 102, 104, 106 have radio coverage.

In an embodiment, the dedicated network entity 200 includes a transmitter/receiver unit 160 for communicating with the antenna units 100, 102, 104, 106. The network entity 200 can also have wired or wireless communication link 161 with the common base station 140. The network entity 200 further comprises a processing unit 204 for controlling the functions of the network entity 200.

The dedicated network entity 200 can be a simple transmitter/receiver dedicated for carrier phase synchronization only. A dedicated reliable connection 161, e.g. an optical fiber, can be arranged between the network entity 200 and the common base station 140. However, other connections between the network entity 200 and the common base station 140 are also possible. In an embodiment, e.g. in case of low mobility applications, if the usage of the dedicated network entity 200 is not desirable the phase difference can also be measured and reported by one or more user entities 150 via any connections 132, 133 to the base station 140. The simple feedback commands can also be conveyed over a reverse radio channel by using only a small part of the resources of the reverse channel.

In an embodiment, a receiver 160 of the network entity 200 receives pilot signals from a plurality of antenna units 100, 102, 104, 106 of the distributed antenna system. Then the processing unit 204 of the network entity 200 determines a phase difference between at least part of the plurality of antenna units on the basis of the received pilot signals, and the transmitter 160 transmits phase correction commands to the common base station 140 of the plurality of antenna units 100, 102, 104, 106 on the basis of the determined phase difference in order to synchronize carrier phases between at least part of the antenna units of the distributed antenna system.

Figure 2:
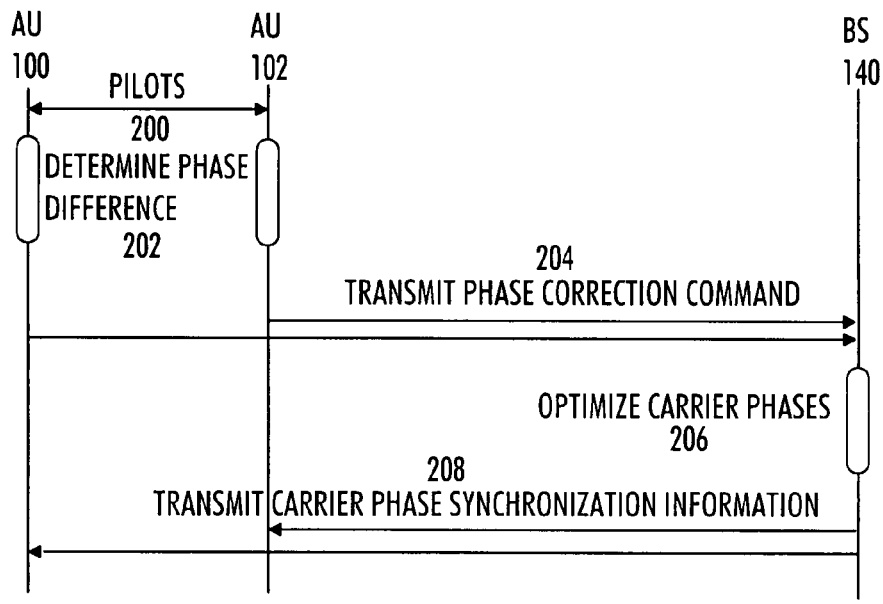
FIG. 2 illustrates a signaling diagram for carrier phase synchronization in a distributed antenna system according to an embodiment of the invention.

FIG. 2 illustrates a signaling diagram for carrier phase synchronization in a distributed antenna system according to an embodiment of the invention. Pilot signals are transmitted from different antenna units 100, 102 in 200. The antenna units determine a phase difference between at least part of a plurality of antenna units in 202. Phase correction commands are sent to a common base station 140 of the antenna units in 204. The common base station 140 optimizes carrier phases of the antenna units on the basis of the received phase correction commands in 206. The base station finally transmits carrier phase synchronization information to the antenna units to synchronize carrier phases in 208.

Figure 3:
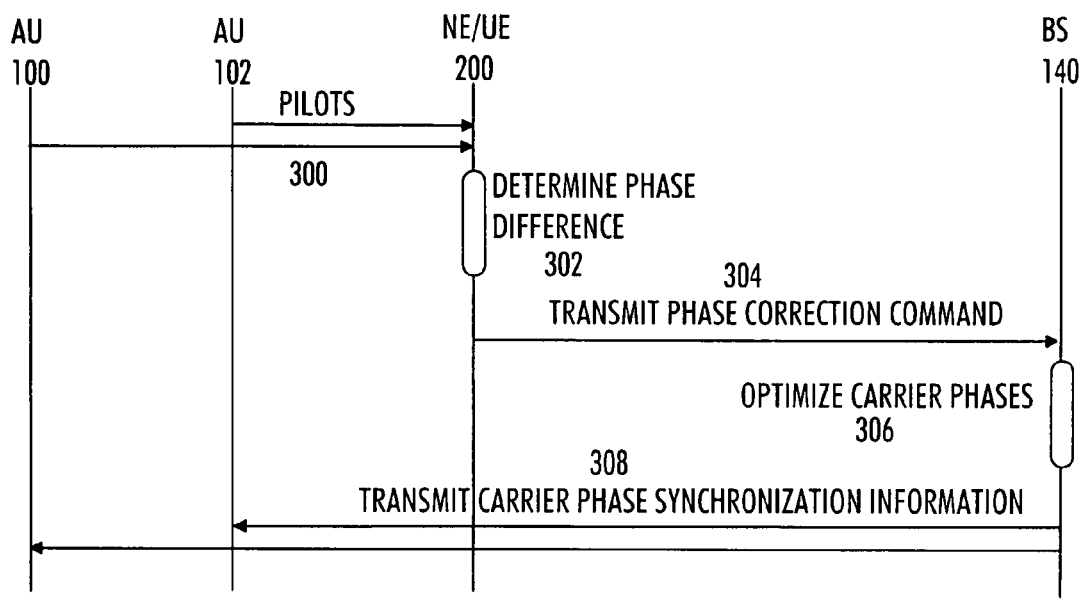
FIG. 3 illustrates another example of a signaling diagram for a carrier phase synchronization in a distributed antenna system according to an embodiment of the invention.

FIG. 3 illustrates another example of a signaling diagram for a carrier phase synchronization in a distributed antenna system according to an embodiment of the invention. Pilot signals are transmitted from different antenna units 100, 102 to a dedicated network entity 200 in 300. The network entity 200 may also be a user entity in coverage area of the antenna units 100, 102. The network entity determines the phase difference between the pilot signals received from the antenna units 302. Any method can be used for measuring the phase difference. The network entity transmits phase correction commands to the base station 140 in 304. The effective feedback commands can be easily designed according to the actual system architecture. The required data rate of the feedback can be dependent on the stability of the connections between the common base station and the distributed antenna units. The common base station 140 optimizes carrier phases of the antenna units on the basis of the received phase correction commands from the network entity 200 in 306. The base station finally transmits carrier phase synchronization information to the antenna units to synchronize carrier phases in 308. It is also possible that the carrier phase synchronization information is provided via the network entity 200.

Figure 4:
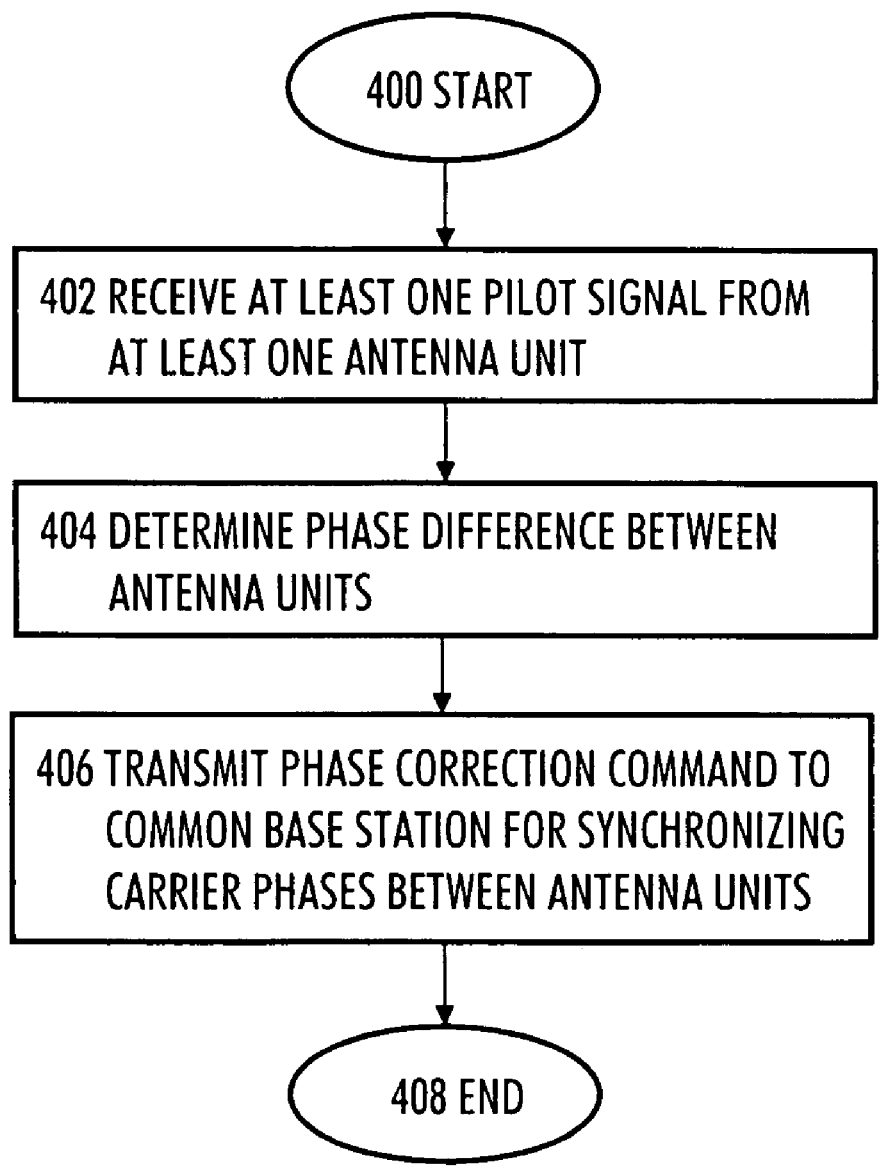
FIG. 4 illustrates a flow diagram of a synchronization process according to an embodiment of the invention.

FIG. 4 illustrates a flow diagram of a synchronization process according to an embodiment of the invention. The method starts in 400. In 402, at least one pilot signal is received from at least one antenna unit of a distributed antenna system. In 404, a phase difference between at least two antenna units of a distributed antenna system is determined on the basis of the received at least one pilot signal from at least one of the plurality of antenna units. In 406, phase correction commands are transmitted to a common base station of the plurality of antenna units on the basis of the determined phase difference in order to synchronize carrier phases between at least the two antenna units of the distributed antenna system. The method ends in 408.

The proposed feedback assisted carrier phase correction according to embodiments of the invention can be implemented in many different ways according to the desired accuracy and the cost implications. In an embodiment, the pilot signals transmitted from the antenna units can be received directly by the other antenna units during, e.g. predefined idle periods dedicated for the carrier phase synchronization process. Then, existing connections between the antenna units and the base station can be continuously utilized to provide highly accurate phase drift tracking. In case the antenna units are placed too far from each other or a direct connection is obstructed, then dedicated fixed terminals can be located in an area where the antenna units have radio coverage. The dedicated terminal (not a real user) measures the phase differences between different pilot symbols transmitted by different antenna units, and then feeds back correction commands to the base station via wired or wireless connection.

The full carrier synchronization between different antenna groups permits full cooperation between all antenna units of a certain base station in the network and, thus the network capacity is dramatically increased. All the existing transmission techniques for the collocated multiple antennas systems can be extended to the distributed MIMO systems in a straightforward manner. By forming a closed loop through the feedback also the phase errors coming from different propagation times through link cables (between common base station and different distributed antenna groups) can be compensated. Basically, all the imperfections coming from the whole transmission chain (e.g. base band processing unit, frequency conversion, radio frequency amplifiers, antenna array calibrations, etc.) that cause phase error between antennas groups can be globally compensated.

Further, radio frequency connection cables between the common base station and antennas groups that would be otherwise required can be replaced by considerably cheaper base band connections (e.g. optical fiber) and the conversion from the base band to the radio carrier level (carrier modulation) is independently realized at each antenna group. The phase difference between the oscillators used at each antenna group is automatically compensated through the feedback.

The embodiments of the invention may be used for carrier phase synchronization in any distributed antenna systems, and it is particularly useful for the future MIMO based 4G systems, where two or more distributed antenna groups may be required to transmit in a cooperative fashion toward a given user. Another application of the proposed invention is sensors array networks where the capacity approaching transmission strategy can be seen as a distributed beamforming architecture that requires that the network is synchronized at the carrier level. The embodiments of the invention can also be applied to certain cooperative relaying techniques.

The embodiments of the invention may be realized in a distributed communication system, comprising a controller. The controller may be configured to perform at least some of the steps described in connection with the flowchart of FIG. 4 and in connection with FIGS. 2 and 3. The embodiments may be implemented as a computer program comprising instructions for executing a computer process for synchronizing.

The computer program may be stored on a computer program distribution medium readable by a computer or a processor. The computer program medium may be, for example but not limited to, an electric, magnetic, optical, infrared or semiconductor device. The computer program medium may include at least one of the following media: a computer readable medium, a program storage medium, a record medium, a computer readable memory, a random access memory, an erasable programmable read-only memory, and computer readable printed matter.

Even though the invention has been described above with reference to an example according to the accompanying drawings, it is clear that the invention is not restricted thereto but it can be modified in several ways within the scope of the appended claims.

The invention claimed is:

1. A method, comprising:
    receiving at least one pilot signal from at least one of a plurality of antenna units of a multiple-input multiple-output (MIMO) distributed antenna system during a predefined idle period dedicated for a control process;
    determining a phase difference between at least two antenna units of the multiple-input multiple-output (MIMO) distributed antenna system on the basis of the at least one pilot signal received from the at least one of the plurality of antenna units;
    transmitting phase correction commands to a common base station of the at least one of the plurality of antenna units on the basis of the determined phase difference in order to synchronize carrier phases between the at least two antenna units of the multiple-input multiple-output (MIMO) distributed antenna system; and
    compensating the phase difference between the at least two antenna units of the multiple-input multiple-output (MIMO) distributed antenna system based on a carrier phase synchronization information received from the base station in response to the transmitted phase correction commands.

2. The method of claim 1, further comprising: receiving the at least one pilot signal directly from the at least one of the plurality antenna units.

3. The method of claim 1, further comprising: receiving the at least one pilot signal by one or more dedicated network entities of the multiple-input multiple-output (MIMO) distributed antenna system.

4. The method of claim 3, further comprising: determining the phase difference between the at least two antenna units in the one or more dedicated network entities; and transmitting the phase correction commands to the common base station by the one or more dedicated network entities.

5. The method of claim 3, further comprising: arranging the one or more dedicated network entities to include one or more transmitter/receivers dedicated for carrier phase synchronization.

6. The method of claim 1, wherein the compensating further comprises: compensating the phase difference between oscillators used at each antenna unit of the multiple-input multiple-output (MIMO) distributed antenna system on the basis of the phase correction commands.

7. The method of claim 1, further comprising: providing continuous phase shift tracking by the common base station on the basis of the phase correction commands.

8. A communication system, comprising:
    a plurality of antenna units of a multiple-input multiple-output (MIMO) distributed antenna system; a common base station of the plurality of antenna units;
    a processing unit configured to determine a phase difference between at least two antenna units on the basis of at least one pilot signal received from at least one of a plurality of antenna units and to provide phase correction commands to the common base station of the plurality of antenna units on the basis of the determined phase difference, wherein the at least one pilot signal is received during a predefined idle period dedicated for a control process; and
    a synchronizing unit configured to synchronize carrier phases between the at least two antenna units of the multiple-input multiple-output (MIMO) distributed antenna system on the basis of the transmitted phase correction commands,
    wherein the synchronizing unit is configured to compensate the phase difference between the at least two antenna units of the multiple-input multiple-output (MIMO) distributed antenna system based on a carrier phase synchronization information received from the base station in response to the transmitted phase correction commands.

9. The communication system of claim 8, wherein the processing unit configured to determine the phase difference resides in an antenna unit of the multiple-input multiple-output (MIMO) distributed antenna system, in a user entity of the multiple-input multiple-output (MIMO) distributed antenna system, or in one or more dedicated network entities of the multiple-input multiple-output (MIMO) distributed antenna system.

10. The communication system of claim 8, wherein the processing unit for providing the phase correction commands to the common base station resides in an antenna unit of the multiple-input multiple-output (MIMO) distributed antenna system, in a user entity, or in one or more dedicated network entities of the multiple-input multiple-output (MIMO) distributed antenna system.

11. The communication system of claim 8, wherein the at least one pilot signal is received by an antenna unit of the multiple-input multiple-output (MIMO) distributed antenna system directly from the at least one of the plurality of antenna units.

12. The communication system of claim 8, wherein the at least one pilot signal is received by one or more dedicated network entities of the multiple-input multiple-output (MIMO) distributed antenna system.

13. The communication system of claim 8, wherein the synchronizing unit is configured to compensate the phase difference between oscillators used at each antenna unit of the multiple-input multiple-output (MIMO) distributed antenna system on the basis of the phase correction commands.

14. The communication system of claim 8, wherein the synchronizing unit is configured to provide continuous phase shift tracking on the basis of the phase correction commands.

15. A base station, comprising: a processing unit configured to receive phase correction commands relating to a plurality of antenna units of a multiple-input multiple-output (MIMO) distributed antenna system, the phase correction commands being determined on the basis of a determined phase difference between at least two antenna units and on the basis of at least one pilot signal from at least one of the plurality of antenna units, wherein the at least one pilot signal is received during a predefined idle period dedicated for a control process; and
    a synchronizing unit configured to synchronize carrier phases between at least two antenna units of the multiple-input multiple-output (MIMO) distributed antenna system on the basis of the received phase correction commands.

16. The base station of claim 15, wherein the processing unit is further configured to compensate the phase difference between oscillators used at each antenna unit of the multiple-input multiple-output (MIMO) distributed antenna system on the basis of the received phase correction commands.

17. The base station of claim 15, wherein the processing unit is further configured to provide continuous phase shift tracking on the basis of the received phase correction commands.

18. An antenna unit, comprising:
    one or more antennas of a multiple-input multiple-output (MIMO) distributed antenna system configured to enable transmission and reception of signals; and
    a processing unit configured to provide a pilot signal to enable determination of a phase difference between at least part of a plurality of antenna units of the multiple-input multiple-output (MIMO) distributed antenna system, and to enable a common base station of the plurality of antenna units to synchronize carrier phases between at least two antenna units on the basis of the determined phase difference, wherein the at least one pilot signal is received during a predefined idle period dedicated for a control process.

19. The antenna unit of claim 18, wherein the processing unit is further configured to determine the phase difference between the at least part of the plurality of antenna units of the multiple-input multiple-output (MIMO) distributed antenna system on the basis of at least one pilot signal received from at least one of the plurality of antenna units.

20. The antenna unit of claim 19, further comprising a phase correction processing unit configured to provide phase correction commands to the common base station of the plurality of antenna units on the basis of the determined phase difference.

21. The antenna unit of claim 18, wherein the one or more antenna units are configured to receive at least one pilot signal directly from at least one of the plurality of antenna units.

22. The antenna unit of claim 18, wherein the antenna unit is configured to transmit the pilot signal to one or more dedicated network entities to enable determination of the phase difference between the antenna units in the one or more dedicated network entities, and to enable the transmission of a phase correction command to the common base station by the one or more dedicated network entities.

23. A network entity, comprising: a receiver configured to receive pilot signals from a plurality of antenna units of a multiple-input multiple-output (MIMO) distributed antenna system during predefined idle periods dedicated for a control processes;
    a processing unit configured to determine a phase difference between at least two antenna units on the basis of the received pilot signals; and
    a transmitter configured to transmit phase correction commands to a common base station of the plurality of antenna units on the basis of the determined phase difference in order to synchronize carrier phases between the at least two antenna units of the multiple-input multiple-output (MIMO) distributed antenna system.

24. A non-transitory computer-readable storage medium encoding instructions for executing a computer process for synchronizing, the process comprising:
    receiving at least one pilot signal from at least one of a plurality of antenna units of a multiple-input multiple-output (MIMO) distributed antenna system during a predefined idle period dedicated for a control process;
    determining a phase difference between at least two antenna units of the multiple-input multiple-output (MIMO) distributed antenna system on the basis of the at least one pilot signal received from the at least one of the plurality of antenna units; and
    transmitting phase correction commands to a common base station of the at least one of the plurality of antenna units on the basis of the determined phase difference in order to synchronize carrier phases between the at least two antenna units of the multiple-input multiple-output (MIMO) distributed antenna system.

25. The non-transitory computer-readable storage medium of claim 24, the storage medium including at least one of the following media: a computer readable medium, a program storage medium, a record medium, and a computer readable memory.

26. A communication system, comprising:
    a plurality of antenna units of a multiple-input multiple-output (MIMO) distributed antenna system;
    a common base station of the plurality of antenna units;
    processing means for determining a phase difference between at least two antenna units on the basis of at least one pilot signal received from at least one of the plurality of antenna units and for providing phase correction commands to the common base station of the plurality of antenna units on the basis of the determined phase difference, wherein the at least one pilot signal is received during a predefined idle period dedicated for a control process; and
    synchronizing means for synchronizing carrier phases between the at least two antenna units of the multiple-input multiple-output (MIMO) distributed antenna system on the basis of the transmitted phase correction commands.

27. The communication system of claim 26, wherein the processing means for determining the phase difference resides in an antenna unit of the multiple-input multiple-output (MIMO) distributed antenna system, in a user entity of the multiple-input multiple-output (MIMO) distributed antenna system, or in one or more dedicated network entities of the multiple-input multiple-output (MIMO) distributed antenna system.

28. The communication system of claim 26, wherein the processing means for providing the phase correction commands to the common base station resides in an antenna unit of the multiple-input multiple-output (MIMO) distributed antenna system, in a user entity or in one or more dedicated network entities of the multiple-input multiple-output (MIMO) distributed antenna system.

29. An antenna entity, comprising:
one or more antennas of a multiple-input multiple-output (MIMO) distributed antenna system for enabling transmission and reception of signals; and
processing means for providing a pilot signal to enable the determination of a phase difference between at least two antenna units of the multiple-input multiple-output (MIMO) distributed antenna system, and for enabling a common base station of the one or more antenna units to synchronize carrier phases between at least two antenna units on the basis of the determined phase difference, wherein the at least one pilot signal is received during a predefined idle period dedicated for a control process.

30. The antenna entity of claim 29, wherein the processing means for determining the phase difference between the at least two antenna units of a multiple-input multiple-output (MIMO) distributed antenna system on the basis of at least one received pilot signal and further comprising:
phase correction processing means for providing phase correction commands to the common base station of the plurality of antenna units on the basis of the determined phase difference.

31. The antenna entity of claim 29, further comprising: transmitting means for transmitting the pilot signal to one or more dedicated network entities to enable the determination of the phase difference between the at least two antenna units in the one or more dedicated network entities, and for enabling the transmission of a phase correction command to the common base station by the one or more dedicated network entities.

32. A network entity, comprising: receiving means for receiving pilot signals from a plurality of antenna units of a multiple-input multiple-output (MIMO) distributed antenna system during predefined idle periods dedicated for a control processes;
transmitting means for transmitting phase correction commands to a common base station of the plurality of antenna units on the basis of the determined phase difference in order to synchronize carrier phases between the at least two antenna units of the multiple-input multiple-output (MIMO) distributed antenna system.

33. A base station, comprising: processing means for receiving phase correction commands relating to a plurality of antenna units of a multiple-input multiple-output (MIMO) distributed antenna system, the phase correction commands being determined on the basis of a determined phase difference between at least two antenna units and on the basis of at least one pilot signal from at least one of the plurality of antenna units, wherein the at least one pilot signal is received during a predefined idle period dedicated for a control process; and
synchronizing means for synchronizing carrier phases between at least two antenna units of the multiple-input multiple-output (MIMO) distributed antenna system on the basis of the received phase correction commands.

* * * * *